United States Patent

Seitz

[11] 4,270,918
[45] Jun. 2, 1981

[54] REACTIVE DYES, PROCESSES FOR THEIR PRODUCTION AND USE THEREOF

[75] Inventor: Karl Seitz, Oberwil, Switzerland

[73] Assignee: Ciba-Geigy Corporation, Ardsley, N.Y.

[21] Appl. No.: 972,621

[22] Filed: Dec. 22, 1978

[30] Foreign Application Priority Data

Jan. 6, 1978 [CH] Switzerland ............................ 143/78

[51] Int. Cl.³ ............................................. C09B 62/06
[52] U.S. Cl. ............................................. 8/549; 8/918; 260/146 T; 260/151; 260/153; 544/181; 544/204
[58] Field of Search ................... 260/146 T, 151, 153; 8/549, 918

[56] References Cited

U.S. PATENT DOCUMENTS

| 3,362,948 | 1/1968 | Andrew et al. | 260/146 T |
| 4,082,739 | 4/1978 | Seitz | 260/146 T |
| 4,128,544 | 12/1978 | Schneider | 260/146 T |

FOREIGN PATENT DOCUMENTS

| 1019771 | 2/1966 | United Kingdom. |
| 1320921 | 6/1973 | United Kingdom. |
| 1348505 | 3/1974 | United Kingdom. |

*Primary Examiner*—A. Lionel Clingman
*Attorney, Agent, or Firm*—Edward McC. Roberts; Michael W. Glynn

[57] ABSTRACT

Reactive dyes of the formula

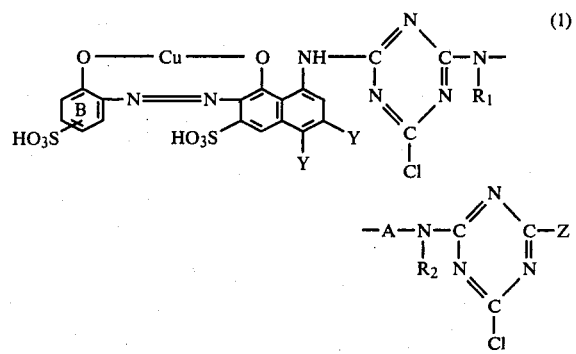

wherein one Y is hydrogen and the other Y is sulfo, $R_1$ and $R_2$ are hydrogen or the group $-N(R_1)-A-N(R_2)-$ is a piperazine radical, A is an alkylene or arylene radical, and Z is an amino, alkoxy or alkylthio group, and the benzene ring B can contain further substituents in addition to the $-SO_3H-$group.

14 Claims, No Drawings

REACTIVE DYES, PROCESSES FOR THEIR PRODUCTION AND USE THEREOF

The present invention relates to reactive dyes of the formula

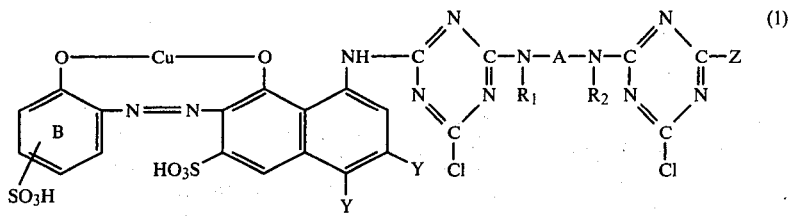

wherein one Y is hydrogen and the other Y is sulfo, $R_1$ and $R_2$ are hydrogen or the group $-N(R_1)-A-N(R_2)-$ is a piperazine radical, A is an alkylene or arylene radical, and Z is an amino, alkoxy or alkylthio group, and the benzene ring B can contain further substituents in addition to the $-SO_3H$ group.

The alkylene or arylene radical A is derived from an aliphatic or aromatic diamine. Accordingly, A can be a linear or branched alkylene radical with a long (e.g. containing 10 or more carbon atoms) or shorter chain, in particular an alkylene radical of 2 to 6 carbon atoms, for example ethylene, propylene, butylene, hexylene or cyclohexylene. Preferably, A is an aromatic radical, for example a naphthylene radical, the radical of a diphenyl or stilbene or especially a phenylene radical. The radical A can contain further substituents, for example halogen atoms, such as fluorine, chlorine and bromine, alkyl groups of 1 to 4 atoms, such as methyl, ethyl and propyl, alkoxy groups of 1 to 4 carbon atoms, such as methoxy, ethoxy, propyloxy and isopropyloxy, acylamino groups of 1 to 6 carbon atoms, such as acetylamino, propionylamino and benzoylamino, ureido, nitro, carboxyl and sulfo groups. If A is an alkylene radical, $R_1$ and $R_2$ can also form a closed aliphatic chain, so that the bridge member

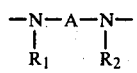

is a piperazine radical. Preferably, A is a phenylene radical. As an amino group, Z can be for example: $-NH_2$, hydroxylamino, hydrazino, phenylhydrazino, sulfophenylhydrazino, methylamino, ethylamino, propylamino, isopropylamino, butylamino, β-ethoxyethylamino, γ-methoxypropylamino, N,N-dimethylamino, N,N-diethylamino, N-methyl-N-phenylamino, N-ethyl-N-phenylamino, β-chloroethylamino, β-hydroxyethylamino, γ-hydroxypropylamino, benzylamino, cyclohexylamino, morpholino, piperidino, piperazino, and in particular aromatic amino groups, such as phenylamino, toluidino, xylidino, chloroanilino, ansidino, phenetidino, 2-, 3- and 4-sulfoanilino, 2,5-disulfoanilino, sulfomethylanilino, N-sulfomethylanilino, 3- and 4-carboxyphenylamino, 2-carboxy-5-sulfophenylamino, 2-carboxy-4-sulfophenylamino, 4-sulfonaphthyl(1)-amino, 3,6-disulfonaphthyl(1)-amino, 3,6,8-trisulfo-naphthyl(1)-amino, and 4,6,8-trisulfonaphthyl(1)-amino. Suitable alkoxy groups represented by Z are: methoxy, ethoxy, propyloxy, isopropyloxy, butyloxy, β-methoxyethoxy, β-ethoxyethoxy, γ-ethoxyethoxy, γ-methoxypropoxy, γ-ethoxypropoxy, γ-propoxypropoxy, γ-isopropoxypropoxy groups. Suitable alkylthio groups represented by Z are: methylthio and ethylthio groups.

Further eligible substituents which the benzene ring B can carry in addition to the $-SO_3H$ group are: halogen, such as chlorine, bromine and fluorine, nitro, acetylamino, methyl, cyano, carboxyl and sulfo. The $-SO_3H$ group is preferably in the para-position, and a further substituent, if present, is in the ortho-position, to the complex forming oxygen atom.

Preferred reactive dyes of the formula (1) are those of the formula

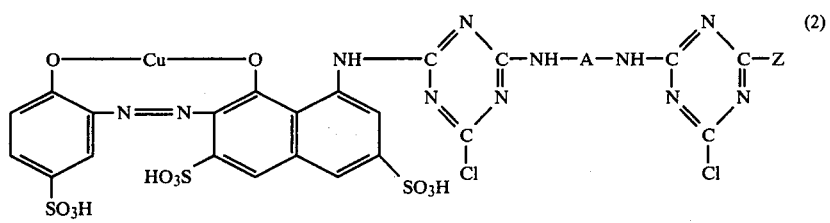

wherein A is a sulfophenyl radical and Z is an amino group. A sulfophenyl radical A in formula (2) is in particular a 1,3- or 1,4-phenylene radical which is substituted by one or two sulfo groups, for example 2- or 3-sulfo-1,4-phenylene, 4- or 6-sulfo-1,3-phenylene, 2,6- or 3,5-disulfo-1,4-phenylene, 2,5-disulfo-1,4-phenylene and 4,6-disulfo-1,3-phenylene. An amino group in the definition of Z in formula (2) is to be understood as meaning in this context and also throughout this specification not only the $H_2N$ group, but also a substituted amino group, for example methylamino, dimethylamino, β-hydroxyethylamino, phenylamino, sulfophenylamino, naphthylamino, or also a cyclic amino group, for example the piperidino or morpholino radical, or, for example, the radical of the amino, hydroxy or thiol compounds which are named as possible starting materials in the description of the process for the production of the reactive dyes of the formula (1).

A valuable dye belonging to the preferred subgroup characterised by the formula (2) is the reactive dye of the formula

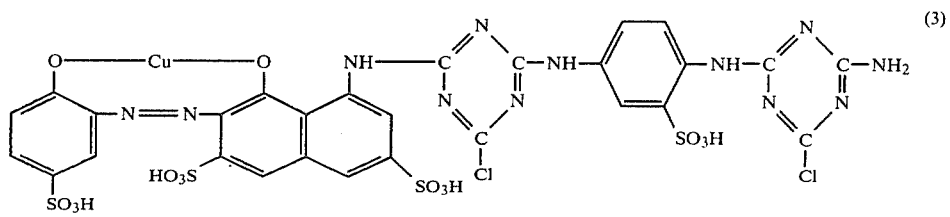 (3)

The dyes of the formula (1) are fibre-reactive, as they contain two removable chlorine atoms in both s-triazine radicals together.

By fibre-reactive compounds are meant those compounds which are able to react with the hydroxyl groups of cellulose or with the amino groups of natural or synthetic polyamides to form covalent chemical bonds.

The reactive dyes of the formula (1) are obtained by coupling, metallising and condensing, in any order, a diazotised diazo component of the formula

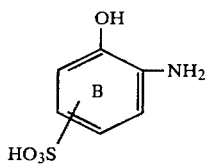 (4), a coupling component of the formula

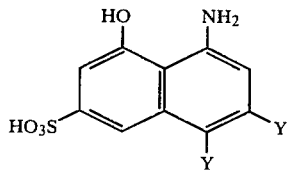 (5)

a copper donor, 2,4,6-trichloro-s-triazine (cyanuric chloride) of the formula

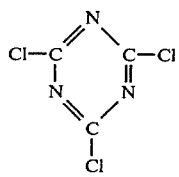 (6), an alkylene or arylenediamine of the formula

H($R_1$)N—A—N($R_2$)H   (7), and an amine, alcohol or alkylthiol of the formula

H—Z   (8)

In the above formulae (4), (5), (7) and (8), the substituents or radicals X, Y, $R_1$, $R_2$, A, Z and B have the same meanings as given for formula (1).

The starting materials employed are in particular a diazo component of the formula (4), wherein the $SO_3H$ group in the benzene ring B is in the para-position to the hydroxyl group, and, if present, a halogen atom, the nitro, acetylamino, methyl, cyano, carboxyl or sulfo group is in the ortho-position to the hydroxyl group, and compounds of the formulae (5), (7) and (8), wherein Y, $R_1$, $R_2$, A and Z are as defined for formula (1).

Preferably, the starting materials are a diazo component of the formula (4), wherein the $SO_3H$ group is in the para-position to the hydroxyl group and the benzene ring B, in addition to the $SO_3H$ group, the OH group and the $NH_2$ group, does not carry any further substituents, a coupling component of the formula (5), wherein the β-oriented Y is the sulfo group, cyanuric chloride, an arylenediamine of the formula $H_2N$—A—$NH_2$   (9)

wherein A is a sulfophenyl radical, and, as compound of the formula (8), an amine.

In a preferred embodiment of the process, 2-aminophenol-4-sulfonic acid, 1-amino-8-hydroxynaphthalene-3,6-disulfonic acid, cyanuric chloride, 1,4-diaminobenzene-2-sulfonic acid, ammonia and a copper donor, are reacted to produce the reactive dye of the formula (3).

As the above described individual process steps, namely diazotisation, coupling, metallising and repeated condensation, can be carried out in varying sequence, and, if desired, in some cases also simultaneously, different variants of the process are possible. The starting materials to be used for each partial reaction follow from formula (1). In general, the reaction is carried out stepwise in succession, whilst the sequence of the simple reactions between the individual reactants of the formula (4) to (8) and the copper donor, can be freely chosen.

Important process variants comprise:

1. Diazotising a diazo component of the formula (4) and coupling it to a coupling component of the formula (5), coppering the resulting azo compound, condensing the copper complex with the cyanuric chloride of the formula (6), condensing the monocondensation product with an alkylenediamine or arylenediamine of the formula (7), condensing the secondary condensation product with cyanuric chloride, and replacing a chlorine atom in the external s-triazine radical by an amino, alkoxy or alkylthio group by condensation with an amine, alcohol or alkylthiol of the formula (8).

The last two reaction steps can also be carried out in reverse order by condensing the secondary condensation product in the last step with the monocondensation product of cyanuric chloride and an amine, alcohol or alkylthiol; or the copper complex is condensed with cyanuric chloride as described above, and the resulting compound is condensed with the secondary condensation product obtained from cyanuric chloride, an alkylenediamine or arylenediamine of the formula (7) and an amine, alcohol or alkylthiol of the formula (8). The coppering can also be carried out after the condensation of the azo compound with cyanuric chloride or after one of the further condensation reactions, for example also in the last step.

2. Condensing cyanuric chloride with a coupling component of the formula (5), coupling the primary condensation product to a diazotised diazo component of the formula (4), coppering the resulting dichloro-s-triazinylaminoazo compound, condensing the copper complex with an alkylenediamine or arylenediamine of the formula (7), condensing the secondary condensation product with cyanuric chloride, and, finally, replacing a chlorine atom in the s-triazine radical by an amino, alkoxy or alkylthio group by condensation with a compound of the formula (8).

In this process variant too, the coppering can be carried out after one of the subsequent condensation reactions instead of after the coupling.

3. Coupling and condensing a diazotised diazo component of the formula (4), a coupling component of the formula (5) and cyanuric chloride, also condensing an alkylenediamine or arylenediamine of the formula (7), cyanuric chloride and a compound of the formula (8), and condensing both intermediates with each other, and carrying out the coppering after the coupling or before the condensation of the two intermediates or subsequently.

4. Condensing cyanuric chloride with a coupling component of the formula (5), condensing the condensation product with an alkylenediamine or arylenediamine of the formula (7), condensing the secondary condensation product with cyanuric chloride and subsequently condensing it with a compound of the formula (8), coupling the product thereby obtained to a diazotised diazo component of the formula (4), and coppering the resulting azo compound in the final step.

5. Coupling a diazotised diazo component of the formula (4) to a coupling component of the formula (5), coppering the resulting azo compound, also condensing the secondary condensation product obtained from cyanuric chloride, an alkylenediamine or arylenediamine of the formula (7) and a compound of the formula (8) with cyanuric chloride, and condensing the intermediate thereby obtained with the cop copper complex obtained above. Instead of condensing with the copper complex in the last step, it is also possible to carry out condensation with the non-coppered azo compound and to copper in the last step.

6. Condensing an alkylenediamine or arylenediamine of the formula (7) with 2 moles of cyanuric chloride, replacing a chlorine atom in the condensation product by an amino, alkoxy or alkylthio group by condensation with a compound of the formula (8), and condensing the intermediate with the copper complex as described in (5), or condensing with the non-coppered azo compound and carrying out the coppering as final process step.

7. Condensing the bireactive intermediate of 6, with a coupling component of the formula (5), coupling the resulting compound to a diazotised diazo compound of the formula (4), and coppering in the final step.

A suitable method of coppering is not only the conventional method described hitherto, in which a o,o'-dihydroxyazo compound is present even before the treatment with the copper donor, but also oxidative coppering, in which the hydroxyl group required for the complexing is not introduced into the benzene nucleus until during the coppering by simultaneous treatment with an oxidising agent. In this case, instead of a 1-hydroxy-2-aminobenzene-4-sulfonic acid of the formula (4), the corresponding 1-aminobenzene-3-sulfonic acid is used as diazo component.

In the method of saponifying coppering, however, it is also possible to use diazo components which contain in the 1-position of the benzene nucleus an alkoxy group, especially a methoxy group, instead of the hydroxyl group. Under suitable reaction conditions, this alkoxy group is converted into the hydroxyl group during the coppering reaction by elimination of the alkyl radical.

If the coppering is carried out by the method of oxidative or saponifying coppering, and, in accordance with the chosen process variant, the $H_2N$ group in the coupling component of the formula (5) is still free in the coppering stage, i.e. it is not yet bonded to the chloro-s-triazine radical, as in process variants (1), (3), (5) and (6), then it is advantageous to use, instead of the coupling components of the formula (5), the corresponding N-acetyl compounds as coupling components, and to remove the acetyl group again by saponification when the complexing is complete.

The manufacture of the intermediates is not described in every case in the following Examples; but it may be readily deduced from the foregoing description.

The following compounds are representative examples of starting materials of the formulae (4) to (8) which can be used for the production of the reactive dyes of the formula (1):

Diazo components of the formula (4)

1-hydroxy-2-aminobenzene-4-sulfonic acid,
1-hydroxy-2-amino-6-chlorobenzene-4-sulfonic acid,
1-hydroxy-2-amino-6-nitrobenzene-4-sulfonic acid,
1-hydroxy-2-amino-6-acetylaminobenzene-4-sulfonic acid,
1-hydroxy-2-aminobenzene-4,6-disulfonic acid,
1-methoxy-2-aminobenzene-4-sulfonic acid,
1-methoxy-2-amino-6-chlorobenzene-4-sulfonic acid,
1-methoxy-2-aminobenzene-4-sulfonic acid,
1-aminobenzene-3-sulfonic acid,
1-amino-3-nitrobenzene-5-sulfonic acid,
1-aminobenzene-3,5-disulfonic acid,
1-hydroxy-2-aminobenzene-5-sulfonic acid,
1-hydroxy-2-amino-4-chlorobenzene-5-sulfonic acid,
1-hydroxy-2-amino-4-methylbenzene-5-sulfonic acid,
1-hydroxy-2-amino-4-chlorobenzene-6-sulfonic acid,
1-hydroxy-2-amino-4-methylbenzene-6-sulfonic acid
1-hydroxy-2-amino-4-nitrobenzene-6-sulfonic acid.

Coupling components of the formula (5)

1-amino-8-hydroxynaphthalene-3,6-disulfonic acid (H acid),
1-amino-8-hydroxynaphthalene-4,6-disulfonic acid (K acid),
1-acetylamino-8-hydroxynaphthalene-3,6-disulfonic acid,
1-acetylamino-8-hydroxynaphthalene-4,6-disulfonic acid.

2,4,6-Trichloro-s-triazine (cyanuric chloride) of the formula (6)

Alkylenediamines or arylenediamines of the formula (7)

ethylenediamine, n-propylenediamine, n-butylenediamine,
1-methyl-n-propylenediamine,
n-hexylenediamine,
2- ethyl-n-butylenediamine,
1,3-diaminobenzene,
1,4-diaminobenzene, 1,3-diamino-4-chlorobenzene,
1,3-diamino-4-methylbenzene,
1,3-diamino-4-ethylbenzene,
1,3-diamino-e-methoxybenzene,
1,3-diamino-4-ethoxybenzene,
1,4-diamino-2-methylbenzene,
1,4-diamino-2-methoxybenzene,
1,4-diamino-2-ethoxybenzene,
1,4-diamino-2-chlorobenzene,
1,4-diamino-2,5-dimethylbenzene,
1,4-diamino-2,5-diethylbenzene,
1,4-diamino-2-methyl-5-methoxybenzene,
1,4-diamino-2,5-dimethoxybenzene,
1,4-diamino-2,5-diethoxybenzene,
2,6-diamino-naphthalene,
1,3-diamino-2,4,6-trimethylbenzene,
1,4-diamino-2,3,5,6-tetramethylbenzene,
1,3-diamino-4-nitrobenzene,
4,4'-diaminostilbene,
4,4'-diaminodiphenylmethane,
4,4'diaminodiphenyl (benzidine),
3,3'-dimethylbenzidine,
3,3'-dimethoxybenzidine,
3,3'-dichlorobenzidine,
3,3'-dicarboxybenzidine,
3,3'-dicarboxymethoxybenzidine,
2,2'-dimethylbenzidine,
4,2'-diaminodiphenyl (diphenyline)
2,6-diaminonaphthalene-4,8-disulfonic acid,
1,4-diaminobenzene-2-sulfonic acid,
1,4-diaminobenzene-2-sulfonic acid,
1,4-diaminobenzene-2,6-disulfonic acid,
1,3-diaminobenzene-4-sulfonic acid,
1,3-diaminobenzene-4,6-disulfonic acid,
1-amino-3-acetylaminobenzene (subsequently saponified),
1-amino-3-acetylamino-6-methylbenzene (subsequently saponified),
1-amino-3-acetylamino-6-methoxybenzene (subsequently saponified)
1,4-diamino-2-chlorobenzene-5-sulfonic acid,
1,4-diamino-2-methylbenzene-5-sulfonic acid,
3-(3'-or 4'-aminobenzoylamino)-1-aminobenzene-6-sulfonic acid,
1-(4'-aminobenzoylamino)-4-aminobenzene-2,5-disulfonic acid,
1,4-diaminobenzene-2-carboxylic acid,
1,3-diaminobenzene-4-carboxylic acid,
1,4-diamino-2-methylbenzene,
4,4'-diaminodiphenyl oxide,
4,4'-diaminodiphenylurea-2,2'-disulfonic acid,
4,4'-diaminodiphenyloxyethane-2,2'disulfonic acid,
4,4'-diaminostilbene-2,2'-disulfonic acid,
4,4'-diaminodiphenylethane-2,2'-disulfonic acid, piperazine.

Amines, alcohols and alkylthiols of the formula (8)

ammonia, methylamine, dimethylamine, ethylamine, diethylamine, propylamine, isopropylamine, butylamine, dibutylamine, isobutylamine, sec-butylamine, tert-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, $\beta$-sulfatoethylamine, benzylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, o-, m- and p-nitroaniline, o-, m- and p-aminophenol, 2-methyl-4-nitro-aniline, 2-methyl-5-nitroaniline, 2,5-dimethoxyaniline, 3-methyl-4-nitro-aniline, 2-nitro-4-methyl-aniline, 3-nitro-4-methyl-aniline, o-, m and p-phenylenediamine, 3-amino-4-methyl-aniline, 4-amino-3-methyl-aniline, 2-amino-4-methyl-aniline, o-, m- and p-anisidine, o-, m- and p-phenetidine, naphthylamine-(1), naphthylamine- (2), orthanilic acid, metanilic acid, sulfanilic acid, aniline-2,4-disulfonic acid, aniline-2,5-disulfonic acid, anthranilic acid, m- and p-aminobenzoic acid, 2-aminotoluene-4-sulfonic acid, 2-aminotoluene-5-sulfonic acid, p-amino-salicyclic acid, 1-amino-4-carboxy-benzene-3-sulfonic acid, 1-amino-2-carboxy-benzene-5-sulfonic acid, 1-amino-5-carboxy-benzene-2-sulfonic acid, 1-naphthylamine-2-, -3-, -4-, -5-, -6-, -7- and -8-sulfonic acid, 2-naphthylamine-1-, -4-, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8- and -5,8-disulfonic acid, 2-naphthylamine-1,5-, -1,6-, -1,7-, -3,6-, -3,7-, -4,7-, -4,8-, -5,7, and -6,8-disulfonic acid, 1-naphthylamine-2,4,6-, 2,4,7-, -2,5,7-, -3,5,7-, -3,6,8- and -4,6,8-trisulfonic acid, 2-naphthylamine-1,3,7-, -1,5,7-, -3,5,7-, -3,6,7-, -3,6,8- and -4,6,8-trisulfonic acid, 2-, 3- and 4-aminopyridine, 2-aminobenthiazole, 5-, 6- and 8-aminoquinoline, 2-aminopyrimidine, morpholine, piperidine, piperazine, methanol, ethanol, propanol, isopropanol, n-butanol, isobutanol, sec-butanol, tert-butanol, hexanol, cyclohexanol, $\beta$-methoxyethanol, $\beta$-ethoxyethanol, $\gamma$-methoxypropanol, $\gamma$-ethoxypropanol, $\beta$-ethoxy-$\beta$-ethoxyethanol, glycolic acid, methanethiol, ethanethiol, propanethiol, isopropanethiol, n-butanethiol, thioglycolic acid, thiourea.

The diazotisation of the diazo components of the formula (4) is ordinarily effected by treatment with nitrous acid in an aqueous mineral acid solution at low temperature, and the coupling to the coupling components of the formula (5) is carried out at a weakly acid or neutral to weakly alkaline pH value.

As copper donors it is possible to use for example salts which contain copper as cation, for example copper sulfate and copper acetate. In many cases it is advantageous to use complex copper compounds, for example in the form of copper-ammine complexes, such as copper tetramminesulfates from copper sulfate and ammonia, pyridine or monoethanolamine, or in the form of compounds which contain copper bound as a complex, for example complex copper compounds of the alkali salts of aliphatic aminocarboxylic acids or hydroxycarboxylic acids, such as of glycine, of lactic acid and, in particular, of tartaric acid, such as sodium copper tartrate.

The treatment with the copper donors can be carried out by methods which are known per se, for example at room temperature, if easily metallisable starting compounds are used, or if simultaneously with the metallising it is necessary to effect dealkylation, by heating to temperatures between 50° and 120° in an open vessel, for example with reflux cooling or optionally in a closed vessel under pressure, the pH conditions being provided by the nature of the chosen metallising procedure: for example an acid coppering with copper sulfate and an alkaline coppering with copper tetramminesulfate. If desired, solvents, for example alcohol, dimethyl formamide etc., can also be added during the metallising. In the oxidative coppering, an oxidant, in particular hydrogen peroxide, is added to the reaction mixture, and the reaction is in other respects carried out in the described manner.

The condensation reactions of the cyanuric chloride with the coupling components of the formula (5), the alkylenediamines or arylenediamines of the formula (7) and the compounds of the formula (8) are carried out preferably in aqueous solution or suspension, at low temperature and at weakly acid or neutral to weakly alkaline pH values. Advantageously, hydrogen chloride which is liberated during the condensation is neutralised continuously by the addition of aqueous alkali metal hydroxides, carbonates or bicarbonates.

The reactive dyes of the formula (1) can be isolated and processed to useful dry dyeing preparations. Isolation is effected preferably at as low temperatures as possible by salting out and filtration. The filtered dyes can be dried, if desired after addition of extenders and/or buffers, for example after addition of a mixture of equal parts of monosodium and disodium phosphate. Preferably, drying is carried out at not too elevated temperatures and under reduced pressure. By spray drying the entire reaction mixture, it is possible in certain cases to obtain the dry preparations of the invention direct, i.e. without first isolating the dyes.

The reactive dyes of the formula (1) are distinguished by high reactivity, a high degree of fixation, good build-up and the ease with which non-fixed dye can be washed off. The dyeings and prints obtained with the reactive dyes of the formula (1) are strong and have good lightfastness as well as good wetfastness properties, for example good fastness to washing. They are suitable for dyeing and printing a very wide variety of materials, such as silk, leather, wool, polyamide and polyurethane fibres, and especially cellulosic materials of fibrous structure, such as linen, cellulose, regenerated cellulose, and in particular cotton. They are suitable both for the exhaustion process and for dyeing by the pad-dyeing process, in which the goods are impregnated with aqueous and, if appropriate, also with salt-containing dye solutions, and the dyes are fixed after treatment with alkali or in the presence of alkali, with or without the application of heat.

They are also suitable for printing, in particular on cotton, and also for printing nitrogen-containing fibres, for example wool, silk or blends containing wool.

To improve the wetfastness properties it is advisable to rinse the dyeings and prints thoroughly with cold and hot water, if appropriate with the addition of an agent which acts as a dispersant and promotes the diffusion of nonfixed dye.

In the following Examples, the parts and percentages are by weight.

EXAMPLE 1

A fine suspension of 18.5 parts of cyanuric chloride in 200 parts of ice-water is added at 0° to 5° C. to a neutral suspension of 58.05 parts of the copper complex of the formula

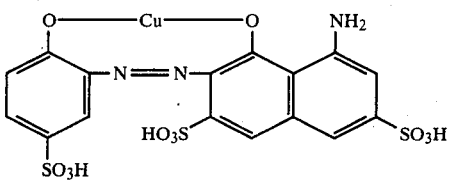

in 400 parts of water. The pH is kept between 6 and 7 during the condensation by the dropwise addition of 2 N sodium hydroxide solution, while allowing the temperature to rise slowly to room temperature. When the condensation is complete, a neutral solution of 18.8 parts of p-phenylenediamine-sulfonic acid in 200 parts of water is added to the clear solution of the dichlorotriazine dye and the hydrochloric acid liberated is neutralised with 2 N sodium hydroxide solution. Towards the end of the second condensation, the reaction mixture is warmed to 40° C. and the monochlorotriazine dye is isolated by addition of sodium chloride.

88 parts of the resulting dye of the formula

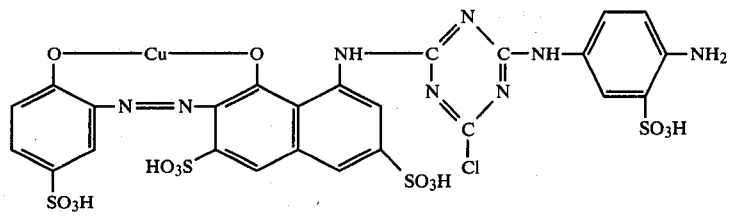

are dissolved neutral in 1000 parts of water and a fine suspension of 18.5 parts of cyanuric chloride in 150 parts of ice-water is added to this solution at 0° to 5° C. The pH is kept at 7 during the condensation by the dropwise addition of 2 N sodium hydroxide solution. When the acylation is complete, 60 parts of a concentrated aqueous ammonia solution are added to the dye solution and the reaction mixture is heated for 3 hours to 40°–45° C. The dye of the formula

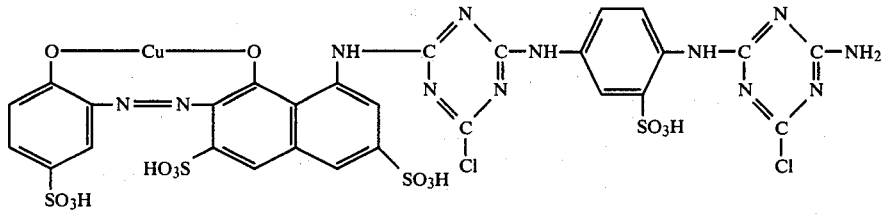

is salted out by the addition of potassium chloride, collected by filtration and dried in vacuo. It dyes cotton by the exhaust method in violet shades.

Table 1 lists further dyes which also dye cotton in violet shades and which are obtained in accordance with this Example by condensing a monoazo dye of the formula

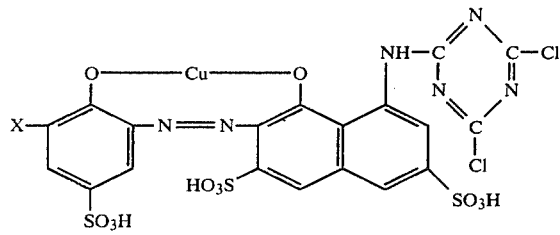

in which X has the meaning given in column I, in succession with a diamine of column II, cyanuric chloride, and an amine of column III.

|    | I       | II                                  | III                |
|----|---------|-------------------------------------|--------------------|
| 1  | —Cl     | 1,4-diaminobenzene-2-sulfonic acid  | ammonia            |
| 2  | —SO₃H   | 1,4-diaminobenzene-2-sulfonic acid  | "                  |
| 3  | —NHCOCH₃| 1,4-diaminobenzene-2-sulfonic acid  | "                  |
| 4  | —NO₂    | 1,4-diaminobenzene-2-sulfonic acid  | "                  |
| 5  | —H      | 1,3-diaminobenzene-4-sulfonic acid  | "                  |
| 6  | —Cl     | 1,3-diaminobenzene-4-sulfonic acid  | "                  |
| 7  | —SO₃H   | 1,3-diaminobenzene-4-sulfonic acid  | "                  |
| 8  | H       | 1,4-diaminobenzene-2-carboxylic acid| "                  |
| 9  | "       | 1,4-diamino-2-methylbenzene-5-sulfonic acid | "          |
| 10 | "       | 1,4-diaminobenzene-2,5-disulfonic acid | "               |
| 11 | "       | 1,4-diaminobenzene-2-sulfonic acid  | ethanolamine       |
| 12 | "       | 1,4-diaminobenzene-2-sulfonic acid  | ethylamine         |
| 13 | "       | 1,4-diaminobenzene-2-sulfonic acid  | diethanolamine     |
| 14 | "       | 1,4-diaminobenzene-2-sulfonic acid  | morpholine         |
| 15 | "       | 1,4-diaminobenzene-2-sulfonic acid  | aniline            |
| 16 | "       | 1,4-diaminobenzene-2-sulfonic acid  | metanilic acid     |
| 17 | "       | 1,4-diaminobenzene-2-sulfonic acid  | methylamine        |
| 18 | "       | 1,4-diaminobenzene-2-sulfonic acid  | o-anisidine        |
| 19 | "       | 1,4-diaminobenzene-2-sulfonic acid  | N,N-dimethylamine  |
| 20 | "       | 1,4-diaminobenzene-2-sulfonic acid  | isopropylamine     |
| 21 | H       | 1,4-diaminobenzene-2-sulfonic acid  | taurine            |
| 22 | H       | 1,4-diaminobenzene-2-sulfonic acid  | o-toluidine        |
| 23 | H       | 1,4-diaminobenzene-2-sulfonic acid  | N-ethylaniline     |
| 24 | H       | 1,4-diaminobenzene-2-sulfonic acid  | sulfonic acid      |
| 25 | H       | 1,4-diaminobenzene-2-sulfonic acid  | 2-naphthylamine-4,8-disulfonic acid |
| 26 | H       | 1,4-diaminobenzene-2-sulfonic acid  | 3-aminophenylurea  |
| 27 | H       | 1,4-diaminobenzene-2-sulfonic acid  | m-chloroaniline    |
| 28 | —SO₃H   | 1,4-diaminobenzene-2-sulfonic acid  | m-toluidine        |
| 29 | "       | 1,4-diaminobenzene-2-sulfonic acid  | p-chloroaniline    |
| 30 | "       | 1,4-diaminobenzene-2-sulfonic acid  | p-aminoacetanilide |
| 31 | "       | 1,4-diaminobenzene-2-sulfonic acid  | 2,4-dimethylaniline|
| 32 | —Cl     | 1,3-diaminobenzene-4-sulfonic acid  | benzylamine        |
| 33 | "       | 1,3-diaminobenzene-4-sulfonic acid  | cyclohexylamine    |
| 34 | "       | 1,3-diaminobenzene-4-sulfonic acid  | N-methylaniline    |
| 35 | "       | 1,3-diaminobenzene-4-sulfonic acid  | 4-aminosalicylic acid |
| 36 | "       | 1,3-diaminobenzene-4-sulfonic acid  | 2-naphthylamino-6-sulfonic acid |
| 37 | H       | 1,4-diaminobenzene-2,5-disulfonic acid | o-toluidine     |
| 38 | H       | 1,4-diaminobenzene-2,5-disulfonic acid | p-aminobenzoic acid |
| 39 | H       | 1,3-diaminopropylene                | ammonia            |
| 40 | H       | 1,4-diaminocyclohexane              | metanilic acid     |
| 41 | H       | piperazine                          | taurine            |

EXAMPLE 2

Condensation of 88 parts of the dye of the formula

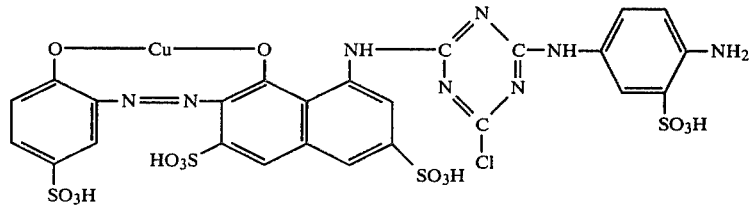

the production of which is described in Example 1, with 16.5 parts of amino-4,6-dichlorotriazine yields a dye which is virtually identical with the dye of Example 1.

EXAMPLE 3

An aqueous solution of 31.65 parts of 2-amino-4-(4'-amino-3'-sulfophenylamino)-6-chloro-1,3,5-triazine is added to an aqueous neutral solution of 72.85 parts of the dichlorotriazine dye of the formula

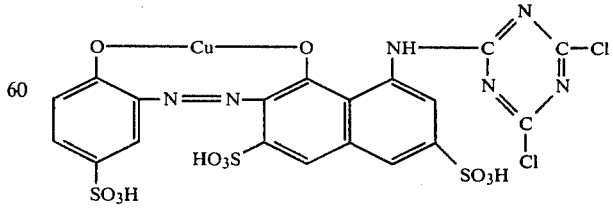

the production of which is described in Example 1. The reaction mixture is warmed to 40°–45° C. and the pH is kept between 6 and 7 by the addition of 2 N sodium hydroxide solution. When the condensation is complete, the dye is salted out, collected by suction and dried in vacuo. The dye of the formula

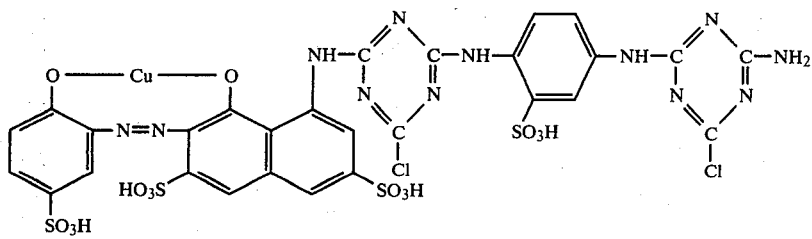

dyes cotton in violet shades.

EXAMPLE 4

Virtually the same dye as in Example 3 is obtained by reacting an aqueous solution of 31.65 parts of 2-amino-4-(4'-amino-3'sulfophenylamino)-6-chloro-1,3,5-triazine firstly with 18.5 parts of cyanuric chloride and carrying out the condensation with 58.05 parts of the copper complex of the formula

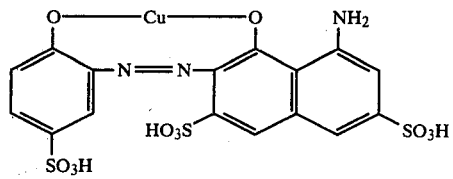

only as final step.

EXAMPLE 5

88 parts of the dye of the formula

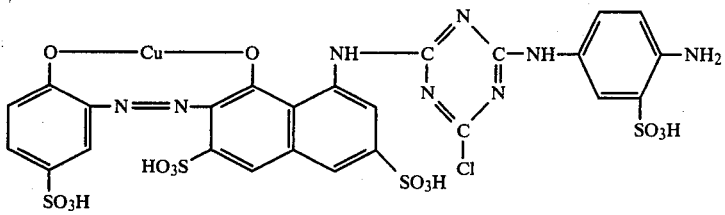

the production of which is described in Example 1, are reacted in the conventional manner with 18 parts of methoxydichlorotriazine, yielding a dye which colours cotton in violet shades.

Similar dyes are obtained by using, instead of methoxydichlorotriazine, equivalent amounts of isopropoxydichlorotriazine or ethoxyethoxydichlorotriazine for the acylation.

Dyeing Procedure 1

2 parts of the dye obtained in Example 1 are dissolved at 20° to 50° C. in 100 parts of water with the addition of 5 to 20 parts of urea and 2 parts of calcined sodium carbonate. A cotton fabric is impregnated with this solution to a pick-up of 60 to 80% and then dried. The fabric is then thermofixed for 30 seconds to 5 minutes at 140° to 210° C., subsequently soaped for a quarter of an hour in a 0.1% boiling solution of a non-ionic detergent, rinsed and dried.

Dyeing Procedure 2

2 parts of the dye obtained in Example 1 are dissolved at 75° C. in 2000 parts of water with the addition of 120 parts of sodium chloride or calcined Glauber's salt. Then 2 to 3 parts of a cotton fabric are put into this dyebath and the temperature is kept constant for 30 to 60 minutes. Two parts of calcined sodium carbonate and 0.3 ml of sodium hydroxide solution (36° Bé) are then added. The temperature is kept for a further 45 to 60 minutes at 75° to 80° C. and the fabric is then soaped for 15 minutes in a 0.1% boiling solution of a non-ionic detergent, rinsed and dried.

Dyeing Procedure 3

1 parts of the dye obtained in Example 1 are dissolved in 100 parts of water while adding 0.5 part of sodium m-nitro-benzenesulfonate. A cotton fabric is impregnated with the resulting solution to a liquor pick-up of 75% and then dried.

The fabric is then impregnated with a warm solution of 20° C. which contains, per liter, 5 g of sodium hydroxide and 300 g of sodium chloride, and squeezed out to a pick-up of 75%. The dyeing is steamed for 30 seconds at 100° to 101° C., rinsed, soaped for a quarter of an hour in a 0.3% boiling solution of a non-ionic detergent, rinsed and dried.

Dyeing Procedure 4

2 parts of the dye obtained in Example 1 are dissolved in 100 parts of water. The solution is added to 1900 parts of cold water, 60 parts of sodium chloride are added and 100 parts of a cotton fabric are put into this dyebath. The temperature is raised to 40° C. and 40 parts of calcined sodium carbonate and another 60 parts of sodium chloride are added after 30 minutes. The temperature is kept for 30 minutes at 40° C. The dyeing is rinsed and then soaped for 15 minutes in a 0.3% boiling solution of a non-ionic detergent, rinsed and dried.

Printing Procedure 2 parts of the dye obtained according to Example 1 are sprinkled, with rapid stirring, into 100 parts of a stock thickening which contains 45 parts of 5% sodium alginate thickening, 32 parts of water, 20 parts of urea, 1 part of sodium m-nitrobenzenesulphonate and 2 parts of sodium carbonate.

A cotton fabric is printed with this printing paste on a roller printing machine. The printed fabric is steamed for 4 to 8 minutes at 100° C. in saturated steam, then thoroughly rinsed in cold and hot water, in the process of which nonfixed dye can be very easily removed from the fabric, and then dried.

What is claimed is:

1. A reactive dye of the formula

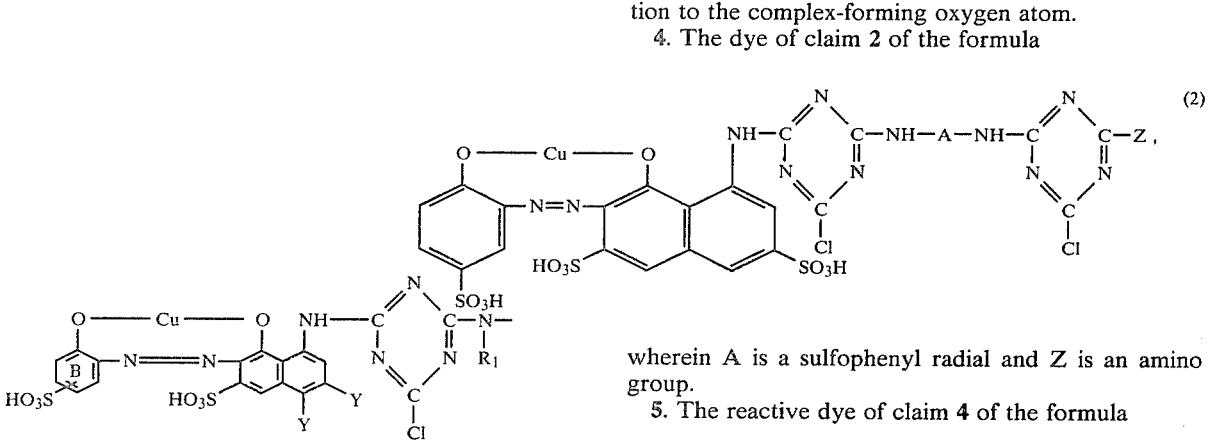

(1)

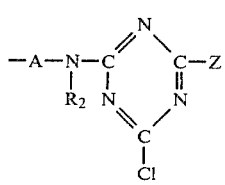

wherein one Y is hydrogen and the other Y is sulfo, $R_1$ and $R_2$ are hydrogen or the group $—N(R_1)—A—N(R_2)—$ is a piperazine radical, A is $C_{2)6}$-alkylene, cyclohexylene or phenylene unsubstituted or substituted by halogen, alkyl of 1 to 4 carbon atoms, alkoxy of 1 to 4 carbon atoms, acylamino of 1 to 6 carbon atoms, ureido, nitro, carboxyl or sulfo, wherein A as phenylene radical does not contain more than 1 sulfo group, and 2 is an amino, alkoxy or alkylthio group, and the benzene ring B is not further substituted or is substituted by halogen, nitro, acetylamino, methyl, cyano, carboxyl or sulfo.

2. The dye of claim 1, wherein the SO$_3$H group in the benzene ring B is in the para-position and, if present, a halogen atom, the nitro, acetylamino, methyl, cyano, carboxyl or sulfo group is in the ortho-position, to the complex forming oxygen atom.

3. The dye of claim 2, wherein the β-oriented Y is the sulfo group, $R_1$ and $R_2$ are hydrogen or the group $—N(R_1)—A—N(R_2)—$ is the piperazine radical, A is propylene, phenylene which can be substituted by sulfo, carboxyl and methyl, or is cyclohexylene or piperazinylene, Z is —NH$_2$, N-C$_1$-C$_4$ alkylamino, N,N-di-C$_1$-C$_4$ alkylamino, β-sulfoethylamino, β-hydroxyethylamino, N,N-di-β-hydroxyethylamino, cyclohexylamino, benzylamino, phenylamino which can be substituted by sulfo, methyl, methoxy, chlorine, acetylamino, ureido, hydroxyl and carboxyl, N-C$_1$-C$_4$ alkyl-N-phenylamino, napththylamino which can be substituted by sulfo, morpholino, C$_1$-C$_4$ alkoxy or C$_1$-C$_4$ alkoxyalkoxy, the —SO$_3$H group in the benzene ring B is in the para-position to the complex forming oxygen atom and the benzene ring B carries, as further substituents, hydrogen, chlorine, nitro, acetylamino or sulfo in the ortho-position to the complex-forming oxygen atom.

4. The dye of claim 2 of the formula

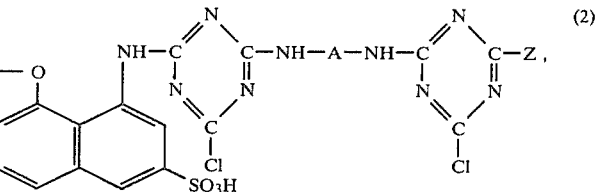

(2)

wherein A is a sulfophenyl radial and Z is an amino group.

5. The reactive dye of claim 4 of the formula

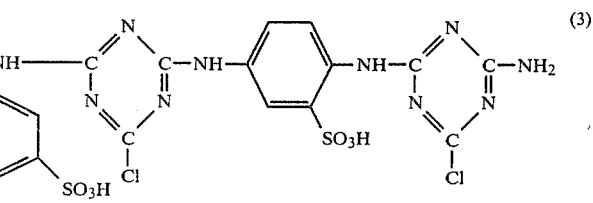

(3)

6. A process for the production of reactive dyes of the formula

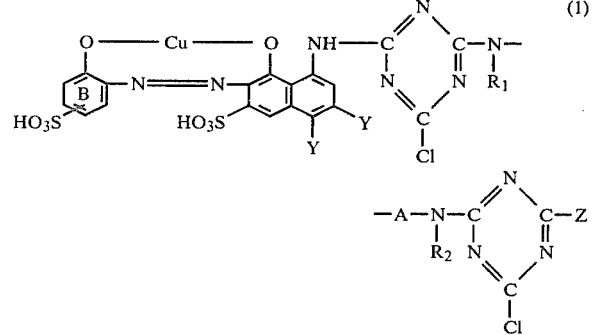

(1)

wherein one Y is hydrogen and the other Y is sulfo, $R_1$ and $R_2$ are hydrogen or the group $—N(R_1)—A—N(R_2)—$ is a piperazine radical, A is $C_{2)6}$-alkylene, cyclohexylene or phenylene unsubstituted or substituted by halogen, alkyl of 1 to 4 carbon atoms, alkoxy of 1 to 4 carbon atoms, acylamino of 1 to 6 carbon atoms, ureido, nitro, carboxyl or sulfo, wherein A as phenylene radical does not contain more than 1 sulfo group, and Z is an amino, alkoxy or alkylthio group, and the benzene ring B is not further substituted or is substituted by halogen, nitro, acetylamino, methyl, cyano, carboxyl or sulfo, which comprises coupling, metallizing and condensing, in any order, a diazotised diazo component of the formula

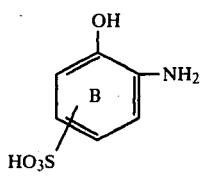   (4), a coupling component of the formula

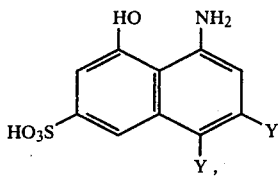   (5)

a copper donor, 2,4,6-trichloro-s-triazine (cyanuric chloride) of the formula

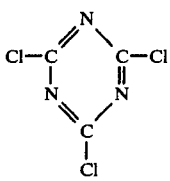   (6), an alkylenediamine or arylenediamine of the formula $$H(R_1)N-A-N(R_2)H \qquad (7)$$

and an amine, alcohol or alkylthiol of the formula $$H-Z \qquad (8)$$

and the substituents or radicals X, Y, $R_1$, $R_2$, A, Z and B in the formulae (4), (5), (7) and (8) having the same meaning as given for formula (1).

7. A process of claim 6, wherein the starting materials are a diazo component of the formula (4), in which the $SO_3H$ group in the benzene ring B is in the para-position, and, if present, a halogen atom, the nitro, acetylamino, methyl, cyano, carboxyl or sulfo group is in the ortho-position, to the hydroxyl group, and compounds of the formulae (5), (7) and (8).

8. A process of claim 7, wherein the starting materials are compounds of the formulae (4), (5), (7) and (8), wherein the β-oriented Y is the sulfo group, $R_1$ and $R_2$ are hydrogen or the group $-N(R_1)-A-N(R_2)-$ is the piperazine radical, A is propylene, phenylene which can be substituted by sulfo, carboxyl and methyl, or is cyclohexylene or piperazinylene, Z is $-NH_2$, N-$C_1$-$C_4$ alkylamino, N,N-di-$C_1$-$C_4$ alkylamino, β-sulfoethylamino, β-hydroxyethylamino, N,N-di-β-hydroxyethylamino, cyclohexylamino, benzylamino, phenylamino which can be substituted by sulfo, methyl, methoxy, chlorine, acetylamino, ureido, hydroxyl and carboxyl, N-$C_1$-$C_4$ alkyl-N-phenylamino, naphthylamino which can be substituted by sulfo, morpholino, $C_1$-$C_4$ alkoxy or $C_1$-$C_4$ alkoxyalkoxy, the $-SO_3H$ group in the benzene ring B is in the para-position to the hydroxyl group and the benzene ring B carries, as further substituents, hydrogen, chlorine, nitro, acetylamino or sulfo in the ortho-position to the hydroxyl group.

9. A process of claim 7 for the production of reactive dyes of the formula (2), wherein the starting materials are a diazo component of the formula (4), wherein the $SO_3H$ group is in the para-position to the hydroxyl group and the benzene ring B, in addition to the $SO_3H$ group, the OH group and the $NH_2$ group, does not carry any further substituents, a coupling component of the formula (5), wherein the β-oriented Y is the sulfo group, cyanuric chloride, an arylenediamine of the formula $$H_2N-A-NH_2 \qquad (9)$$

wherein A is a sulfophenyl radical, and, as compound of the formula (8), an amine.

10. A process of claim 9, wherein 2-aminophenol-4-sulfonic acid, 1-amino-8-hydroxynaphthalene-3,6-disulfonic acid, cyanuric chloride, 1,4-diaminobenzene-2-sulfonic acid, ammonia and a copper donor, are reacted to produce the reactive dye of the formula (3).

11. A process of claim 10, wherein 1-hydroxy-2-aminobenzene-4-sulfonic acid is diazotised and coupled to 1-amino-8-hydroxy-naphthalene-3,6-sulfonic acid, the azo compound is reacted with a copper donor and subsequently condensed with cyanuric chloride, the resulting dichloro-s-triazine compound is condensed with p-phenylenediaminesulfonic acid, the secondary condensation product is condensed with cyanuric chloride, and the bireactive compound thereby obtained is condensed with ammonia to produce the reactive dye of the formula

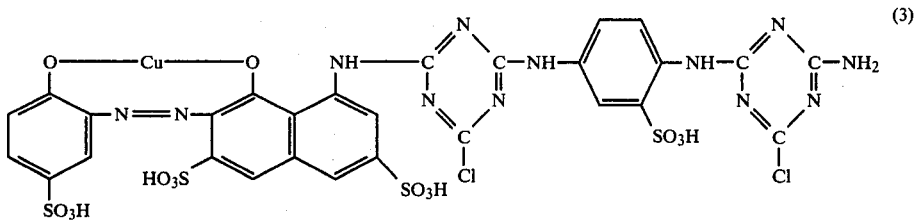   (3)

12. A dye obtained by the process of claim 6.

13. A process for dyeing and printing which comprises the use of a reactive dye of claim 1.

14. A process according to claim 13 for dyeing cellulose fibres.

* * * * *